US011120108B2

(12) United States Patent
Koul et al.

(10) Patent No.: US 11,120,108 B2
(45) Date of Patent: Sep. 14, 2021

(54) MANAGING SECURITY ARTIFACTS FOR MULTILAYERED APPLICATIONS

(71) Applicant: Oracle International Corporation, Redwood Shores, CA (US)

(72) Inventors: Rohit Koul, Milpitas, CA (US); Amit Agarwal, Milpitas, CA (US); Dongguang Zhou, Sunnyvale, CA (US); Vineet Garg, Foster City, CA (US); Krishnakumar Sriramadhesikan, Cupertino, CA (US); Supriya Kalyanasundaram, Cupertino, CA (US); Yulong Cao, San Jose, CA (US); Srivatsa Manjunath, Fremont, CA (US); Anant D. Kadam, Sunnyvale, CA (US); Deepika Damojipurapu, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 259 days.

(21) Appl. No.: 16/147,279

(22) Filed: Sep. 28, 2018

(65) Prior Publication Data

US 2019/0102526 A1 Apr. 4, 2019

Related U.S. Application Data

(60) Provisional application No. 62/566,326, filed on Sep. 30, 2017.

(51) Int. Cl.
*G06F 21/31* (2013.01)
*G06F 21/60* (2013.01)

(52) U.S. Cl.
CPC ............ *G06F 21/31* (2013.01); *G06F 21/602* (2013.01); *G06F 21/604* (2013.01)

(58) Field of Classification Search
CPC ....... G06F 21/31; G06F 21/602; G06F 21/604
See application file for complete search history.

(56) References Cited

U.S. PATENT DOCUMENTS 7,533,364 B2 5/2009 Ramaswamy et al.
8,161,164 B2 4/2012 Chong
(Continued)

FOREIGN PATENT DOCUMENTS

CN 103051631 7/2015

OTHER PUBLICATIONS

Oracle® Fusion Middleware, Administrator's Guide for Authorization Policy Manager "Managing Security Artifacts," 11g Release 1 (11.1.1) E14431-01, Jun. 2010, pp. 1-20.
(Continued)

*Primary Examiner* — Yonas A Bayou
(74) *Attorney, Agent, or Firm* — Kilpatrick Townsend & Stockton LLP

(57) ABSTRACT

The present disclosure relates generally to managing security artifacts for a software application executing on a software stack. Techniques are described for defining a security configuration such that each layer of the software stack may be associated with one or more datastores, each datastore including one or more security artifacts for a particular layer. The security configuration may specify, for example, an order in which the various datastores are to be accessed when a request is received for a security artifact that is available from multiple datastores. Using the security configuration, access to security artifacts can be handled in connection with requests generated through a particular layer in the stack. A system managing the security artifacts can provide a unified view of the datastores such that, from the end-user's perspective, there is only one logical datastore.

20 Claims, 10 Drawing Sheets

(56) References Cited

U.S. PATENT DOCUMENTS

| | | | | |
|---|---|---|---|---|
| 8,453,199 | B2 | 5/2013 | Rits | |
| 9,047,133 | B2 | 6/2015 | Winterfeldt et al. | |
| 9,160,752 | B2 | 10/2015 | Goldszmidt et al. | |
| 9,412,075 | B2 | 8/2016 | Padala et al. | |
| 9,635,055 | B2 | 4/2017 | Mathur et al. | |
| 9,678,727 | B1 | 6/2017 | Chaffin | |
| 2002/0169974 | A1* | 11/2002 | McKune | G06F 21/10 726/31 |
| 2009/0100503 | A1* | 4/2009 | Doyle | H04L 63/08 726/3 |
| 2010/0269166 | A1* | 10/2010 | Awad | G06F 21/55 726/7 |
| 2012/0102574 | A1* | 4/2012 | Schentrup | H04L 63/104 726/28 |
| 2013/0232540 | A1* | 9/2013 | Saidi | H04L 63/10 726/1 |
| 2014/0109176 | A1* | 4/2014 | Barton | G06F 3/0481 726/1 |
| 2014/0173700 | A1* | 6/2014 | Awan | H04L 63/10 726/4 |
| 2014/0189777 | A1* | 7/2014 | Viswanathan | H04L 63/105 726/1 |
| 2015/0007261 | A1* | 1/2015 | Hecht | G06F 21/604 726/1 |
| 2015/0033305 | A1* | 1/2015 | Shear | G06F 21/6218 726/6 |
| 2015/0089575 | A1* | 3/2015 | Vepa | G06F 21/62 726/1 |
| 2015/0172321 | A1* | 6/2015 | Kirti | H04L 63/1441 726/1 |
| 2016/0080341 | A1* | 3/2016 | Jain | H04L 67/327 726/7 |
| 2016/0315926 | A1 | 10/2016 | Agarwal et al. | |
| 2017/0353457 | A1* | 12/2017 | Steeves | H04L 9/3242 |

OTHER PUBLICATIONS

Hartwich; Christoph, "Chapter 3: The Distributed Architecture of Multi-Tiered Enterprise Applications" A Middleware Architecture for Transactional, Object-Oriented Applications, Dissertation am Fachbereich Mathematik und Informatik der Freien Universität Berlin, Dec. 17, 2003, 36 pages.

* cited by examiner

```
┌─────────────────────────────────────────────────────────────────┐
│ IDENTIFY A SECURITY CONFIGURATION FOR A USER, THE SECURITY      │
│ CONFIGURATION INCLUDING A FIRST ASSOCIATION INDICATING THAT     │
│ ONE OR MORE SECURITY ARTIFACTS ASSOCIATED WITH A FIRST LAYER    │
│ ARE STORED IN A FIRST DATASTORE                                 │
│                              710                                │
└─────────────────────────────────────────────────────────────────┘
                                │
                                ▼
┌─────────────────────────────────────────────────────────────────┐
│ DURING EXECUTION OF THE SOFTWARE APPLICATION, RECEIVE A         │
│ REQUEST TO MODIFY OR REPLACE THE FIRST DATASTORE                │
│                              720                                │
└─────────────────────────────────────────────────────────────────┘
                                │
                                ▼
┌─────────────────────────────────────────────────────────────────┐
│             MODIFY OR REPLACE THE FIRST DATASTORE               │
│                              730                                │
└─────────────────────────────────────────────────────────────────┘
                                │
                                ▼
┌─────────────────────────────────────────────────────────────────┐
│ WHILE THE FIRST DATASTORE IS BEING MODIFIED OR REPLACED,        │
│ RECEIVE AN ACCESS REQUEST FOR A SECURITY ARTIFACT ACCESSIBLE    │
│ WITH RESPECT TO THE FIRST DATASTORE WHEN THE FIRST DATASTORE    │
│ IS AVAILABLE                                                    │
│                              740                                │
└─────────────────────────────────────────────────────────────────┘
                                │
                                ▼
┌─────────────────────────────────────────────────────────────────┐
│   IDENTIFY AN ALTERNATIVE DATASTORE FOR ACCESSING THE           │
│                    SECURITY ARTIFACT                            │
│                              750                                │
└─────────────────────────────────────────────────────────────────┘
                                │
                                ▼
┌─────────────────────────────────────────────────────────────────┐
│ PERFORM CONFLICT RESOLUTION PROCEDURE TO DETERMINE WHETHER      │
│ THE ACCESS REQUEST CAN BE SERVICED USING THE ALTERNATIVE        │
│ DATASTORE                                                       │
│                              760                                │
└─────────────────────────────────────────────────────────────────┘
```

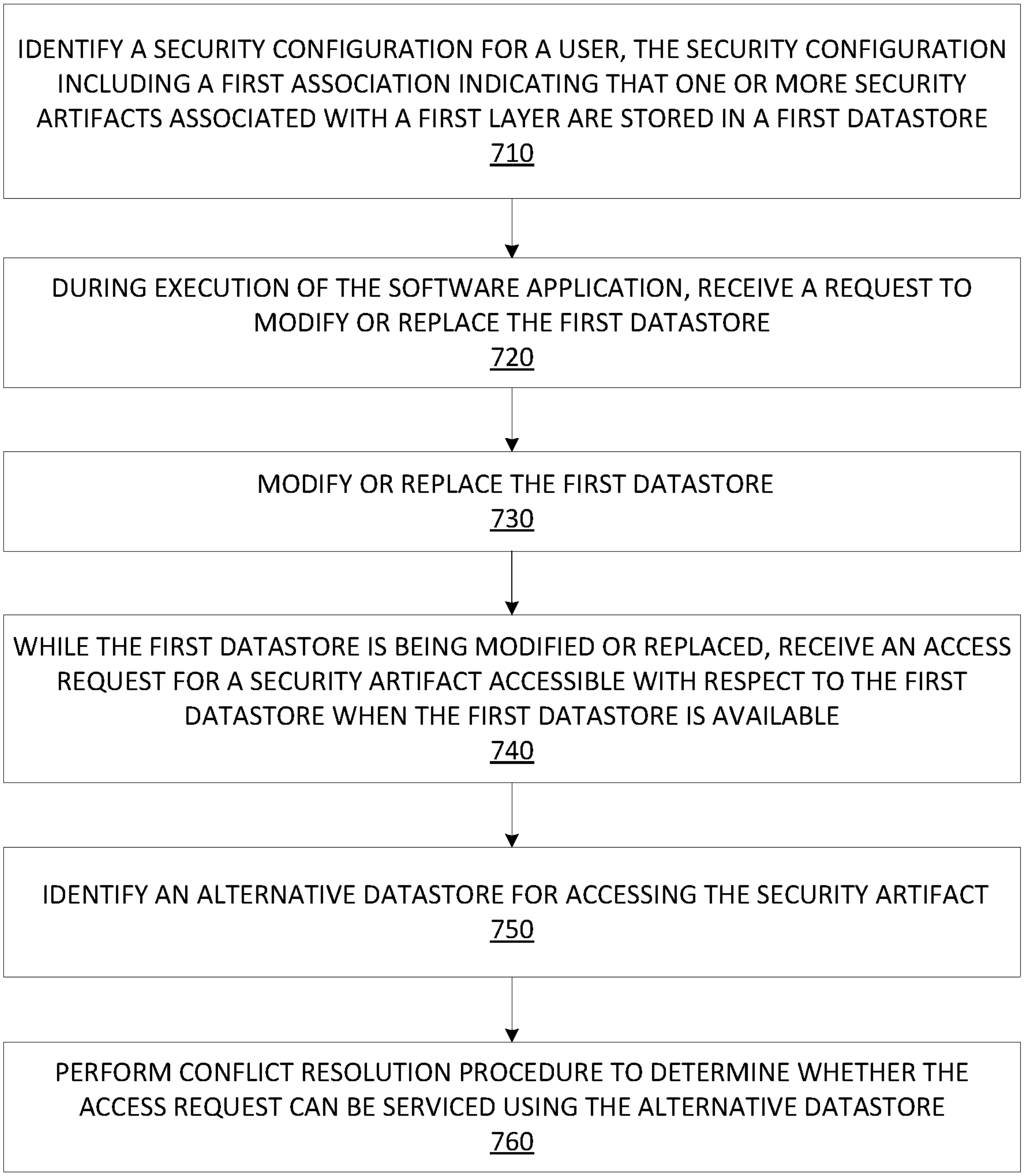

FIG. 7

MANAGING SECURITY ARTIFACTS FOR MULTILAYERED APPLICATIONS

CROSS-REFERENCES TO RELATED APPLICATIONS

This application claims the benefit and priority under 35 U.S.C. 119(e) of U.S. Patent Application No. 62/566,326, filed on Sep. 30, 2017, entitled "Managing Security Artifacts For Multilayered Applications." The contents of U.S. Patent Application No. 62/566,326 are part of this disclosure and are herein incorporated by reference in their entirety for all purposes.

BACKGROUND

Modern software applications are often designed to be run in conjunction with other software components, sometimes as part of a software suite in which different software components work together to provide software functionality to an end-user. Even a single software application is often not completely stand-alone, as applications usually execute within a computing environment including an operating system (OS), a virtual machine (VM), an application server, and/or other software components that support the software application. The various software components may execute on the same or different machines, e.g., a local server and/or a cloud server. Thus, from a system perspective, a software application may encompass multiple components that together form a software stack.

Different layers of a software stack may be secured by different security artifacts. For example, a first layer may be secured by a set of security artifacts that are distinct from those with which a second layer is secured. One way to manage the security artifacts for multiple layers is to store all the artifacts together in a single datastore, e.g., a central database. If the artifacts are located in the same datastore, each layer may be required to apply its own naming conventions or other protocols to ensure that the layer does not inadvertently access artifacts belonging to a different layer. Misconfiguration of a layer could potentially result in exposure of private information (e.g., encryption keys) or execution errors when one layer overwrites an artifact used by another layer. Additionally, execution of a software application sometimes requires access to security artifacts belonging to different layers. Access requests for security artifacts should be handled in a consistent manner so that the software application behaves as a single cohesive unit, regardless of which layer generates an access request and regardless of where the security artifacts are stored.

SUMMARY

The present disclosure relates generally to managing security artifacts, and more particularly to techniques for determining how security artifacts are accessed from a plurality of datastores in connection with runtime execution of a software application executing on a software stack. Security artifacts can include, for example, an encryption key, a certificate, credentials (e.g., a username and password pair), a token, an authorization policy, or an audit policy.

In certain embodiments, a software application executes on a software stack, where each layer is associated with one or more datastores in which security artifacts are made available for access in connection with execution of the software application. Techniques are described for defining a security configuration such that each layer may be associated with one or more datastores, each datastore including one or more security artifacts for a particular layer. The security configuration may indicate, for example, an order in which the various datastores are to be accessed when a request is received for a security artifact that is available from, or available to be written to, multiple datastores. Using the security configuration, access to security artifacts can be handled in connection with requests generated through a particular layer in the stack, e.g., a user interfacing layer. Although the artifacts may be stored in separate datastores, a system managing the security artifacts can provide a unified view of the datastores such that, from the end-user's perspective, there is only one logical datastore.

In certain embodiments, each layer can be independently configured with respect to how its security artifacts are handled. For example, a layer may be associated with a particular datastore chosen by an entity that manages or operates the layer (e.g., a service provider that administrates a middleware layer or a tenant that operates a user interfacing layer). The configuration of a layer may further include access constraints that determine how the security artifacts are accessed (e.g., whether a datastore is read-only or write-only). The ability to independently configure a layer provides flexibility and is especially advantageous in a multi-tenanted environment, where the same software application may be customized for different users or user groups. For example, a tenant may choose to provide its own datastore for certain security artifacts, and may specify that the datastore should be prioritized over datastores of other layers. The tenant may even configure multiple datastores for the same layer and specify an order in which the datastores associated with that layer are to be accessed. A custom security configuration can be generated for a user, e.g., at runtime of the software application. Additionally, a conflict resolution procedure may be applied to determine how security artifacts in multiple datastores are to be accessed (e.g., based on the orders specified for the layers and/or the datastores).

Independent configuration of layers allows for customization of a software application to fit the needs of each user or user group. Additionally, independent configuration enables one layer to be modified while the software application continues to execute. For example, during runtime, a datastore associated with one layer can be modified (e.g., updated with newer versions of security artifacts) or replaced (e.g., by switching to a different datastore) while other layers continue to run. If a security artifact in the datastore being modified is also present in datastores of other layers, those datastores can later be synchronized with the modified datastore. In this manner, datastores of other layers may remain available for servicing access requests for security artifacts in connection with execution of the software application.

In certain embodiments, access requests for security artifacts are handled by a security service system that provides one or more security services (e.g., an authorization service, a key store service, a credential store service, a policy service, an audit service, etc.). The security service system may include a security controller (e.g., a server running Oracle Platform Security Services) that processes access requests received from any layer of a software stack. A layer can be configured for one or more types of services provided by the security service system (e.g., through a subscription process). Each service may be assigned one or more datastores. The security service system may apply security configurations defined for each layer. For a user interfacing layer, the security service system may determine a security configuration for one or more users (e.g., a single end-user or a tenant with multiple end-users). In certain embodiments, the security configuration is a custom security configuration for a user.

The foregoing, together with other features and embodiments, will be described in more detail below in the following specification, claims, and accompanying drawings.

BRIEF DESCRIPTION OF THE DRAWINGS

FIG. 7 is a simplified flowchart depicting processing performed for modifying or replacing a datastore during runtime of a software application according to certain embodiments.

DETAILED DESCRIPTION

Figure 1:
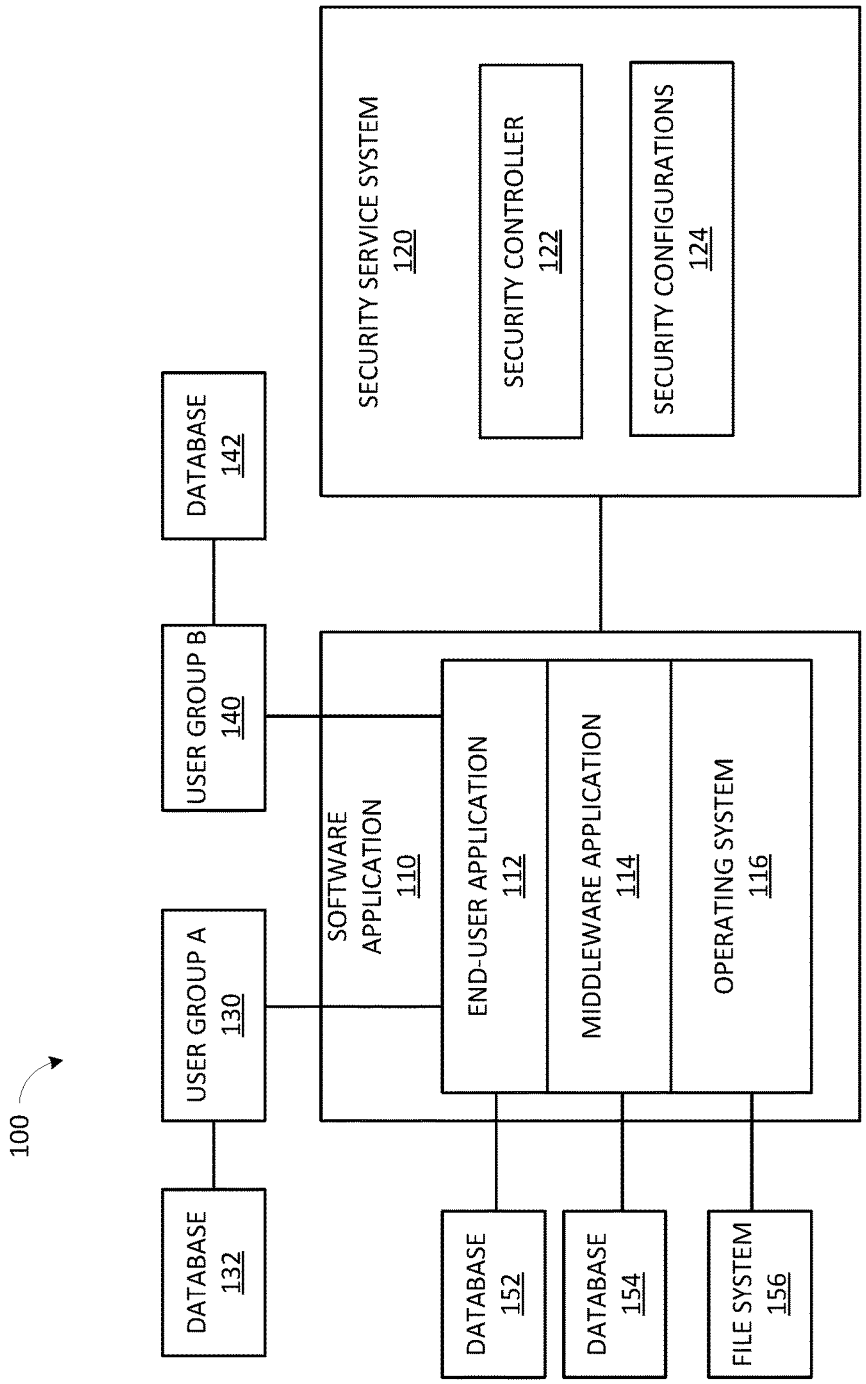
FIG. 1 depicts a system according to certain embodiments described herein.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

The present disclosure relates generally to managing security artifacts, and more particularly to determining how security artifacts are accessed from a plurality of datastores in connection with runtime execution of a software application executing on a software stack. Security artifacts can include secrets (e.g., an encryption key, a certificate, credentials such as a username and password pair, or a token). Security artifacts can also include an authorization policy (e.g., a rule indicating a condition in which a user should be permitted or denied access to a protected resource), or an audit policy (e.g., a rule for monitoring or recording accesses to a datastore).

In certain embodiments, a software application executes on a software stack, where each layer of the software stack is associated with one or more datastores (e.g., file systems or databases) in which security artifacts are made available for access in connection with execution of the software application. Rather than bundling all security artifacts for the software application into a single datastore, techniques are described for defining a security configuration such that each layer may be associated with one or more datastores, each datastore including one or more security artifacts for a particular layer. The security configuration may specify, for example, an order in which the various datastores are to be accessed when a request is received for a security artifact that is available from multiple datastores. Using the security configuration, access to security artifacts can be handled in connection with requests generated through a particular layer in the stack, e.g., a user interfacing layer. Although the artifacts may be stored in separate datastores, a system managing the security artifacts can provide a unified view of the datastores such that, from the end-user's perspective, there is only one logical datastore.

In certain embodiments, each layer can be independently configured with respect to how its security artifacts are handled. For example, a layer may be associated with a particular datastore chosen by an entity that manages or operates the layer (e.g., a service provider that administrates a middleware layer or a tenant that operates a user interfacing layer). The configuration of a layer may further include access constraints on how the security artifacts are accessed (e.g., whether a datastore is read-only or write-only). The ability to independently configure a layer provides flexibility and is especially advantageous in a multi-tenanted environment, where the same software application may be customized for different users or user groups. For example, a tenant may choose to provide its own datastore for certain security artifacts, and may specify that the datastore should be prioritized over datastores of other layers. The tenant may even configure multiple datastores for the same layer and specify an order in which the datastores associated with that layer are to be accessed. In certain embodiments, a custom security configuration can be generated for a user, e.g., at runtime of the software application. Additionally, a conflict resolution procedure can be applied for determining how security artifacts in multiple datastores are to be accessed (e.g., based on the orders specified for the layers and/or the datastores).

The following are some examples of customizations that can be specified for different types of security artifacts. The customizations can be specified using security settings defined for a particular layer of the software stack. For example, a tenant that has acquired (e.g., purchased or licensed) a copy of an end-user application may wish to define a custom security configuration for the tenant's users. The custom security configuration can be applied to access requests generated through a user interfacing layer corresponding to that particular tenant's instance of the end-user application. In certain embodiments, the degree to which the security configurations are customizable may be determined by a service provider that operates the software stack. The service provider can be the same entity that operates the security service system.

In certain embodiments, a security artifact may be a certificate. Each layer of the software stack may have one or more certificates associated with the layer. However, a user of the software application (e.g., a tenant) may want to control which certificates the software application is allowed to use. Accordingly, a security configuration may be defined for the user with respect to access to certificates by the software application. The security configuration may cause the software application to use one or more certificates associated with a first layer and not use one or more certificates associated with a second layer.

In certain embodiments, a security artifact may be an authorization policy. Each layer of the software stack may be associated with one or more authorization policies. However, a user of the software application (e.g., a tenant) may want to control which authorization policies that the software application may use. Accordingly, a security configuration may be defined for the user with respect to access to authorization policies by the software application. For example, the security configuration may cause the software application to use one or more authorization policies associated with a first layer and not use one or more authorization policies associated with a second layer.

In certain embodiments, one or more security artifacts for the software application may be encrypted. Techniques described herein allow for different encryptions schemes to be used for different layers because the layers are configured separately. For example, a first type of encryption may be used to encrypt security artifacts associated with a first layer and a second type of encryption may be used to encrypt security artifacts associated with a second layer.

Because security artifacts are stored in different datastores in embodiments described herein, conflicts may occur. For example, a security artifact in a first datastore may have the same name as a security artifact in a second datastore. Accordingly, a security configuration may allow a user to specify an order in which datastores are accessed, which may ensure that conflicting security artifacts are managed correctly. In certain embodiments, a security service system performs a conflict resolution procedure based on a security configuration that indicates how conflicts that arise between different layers and/or datastores should be handled. Different conflict resolution procedures can be defined for different users or user groups.

Defining security settings for each layer independently ensures the integrity of the security configurations of individual layers. An administrator of one layer can define security settings without having to worry about how their security definitions will affect other layers. Additionally, if an issue arises with a layer (e.g., a datastore associated with the layer needs to be updated), the layer can be patched or updated without having to rebuild or bring the entire software stack offline.

In one illustrative example, a Java application may be deployed in a Java runtime environment. Accordingly, the Java application may execute on a software stack having at least two layers: a Java cloud service layer and an application layer (e.g., a user interfacing layer). The Java cloud service layer may be configured with a policy that allows applications to read (but not write) a credential from a location (e.g., /secret/foo) in a first credential store associated with the Java cloud service layer. The application layer may be configured with a policy that allows the Java application to read and write a credential to/from the same location (/secret/foo) in a second credential store associated with the application layer. At runtime, if the Java application were to generate a write request for writing a credential to/secret/foo, a conflict would arise as to which credential store to use.

To resolve the above described conflict, a security service system may apply a security configuration that includes security settings for the Java cloud service layer as well as security settings for the application layer. The security configuration may include access constraints for the various datastores (e.g., read-only for the first credential store and read-write for the second credential store). Additionally, the security configuration may specify how conflicts between the Java cloud service layer and the application layer should be handled. For example, the security configuration may indicate that, in the case of a conflict caused by a write request, the system should apply the application layer's policy to create a new entry in the second credential store. Alternatively, the security configuration may indicate that the security service system should apply the application layer's policy to modify/overwrite an existing entry in the first credential store (thus overriding the Java cloud service layer's policy). Yet another possibility is that the security configuration indicates that the security service system should apply the Java cloud service layer's policy to deny the write request. The security configuration may indicate which of the three options above should be used based on information in the security configuration that indicates actions to be performed when conflict conditions are met.

Security configurations can also be used to resolve read conflicts. Continuing with the Java application example above, assuming that the security service system decided to overwrite the first credential store, if the first credential store later becomes inaccessible, a request to read/secret/foo may cause issues because the existence or status of the modified entry in the first credential store becomes unknown. Consequently, the security service system may end up recreating the credential as a new entry in the second credential store. Then, when the first credential store becomes accessible again, the conflicting entries in the two credential stores can be resolved based on the security configuration.

In certain embodiments, a security configuration includes constraints that define a conflict resolution procedure (e.g., for conflicts arising from a particular type of access operation such as read, write, update, or delete and/or for conflicts involving a particular type of security artifact). The constraints may be customized for each user or user group. Constraints for determining conflict resolution behavior can also be defined for individual layers to resolve, for example, conflicts arising between different datastores associated with a single layer. As mentioned earlier, the security configuration can be generated or determined at runtime (e.g., through a runtime aggregation of configurations for different layers). This allows the runtime behavior of the software application with respect to access to security artifacts to be defined, customized, and updated in an efficient manner without having to reconfigure every layer.

FIG. 1 depicts a system 100 according to certain embodiments described herein. The system 100 includes a software application 110 executing on a software stack. The system 100 further includes a security service system 120 that provides one or more security services for the software application 110. Security services may include services that handle storage of one or more types of security artifacts for the various layers, in addition to handling access requests for accessing stored security artifacts.

The software stack may include an end-user application 112 that operates as a user interfacing layer. The end-user application 112 may provide a user interface (e.g., a website) through which a user interacts with the software application. The software stack may further include a middleware application 114 that supports the operation of the end-user application 112. For example, the middleware application 114 may receive and process requests communicated from the end-user application 112 (e.g., function calls sent through an application program interface). In some instances, the requests from the end-user application 112 may cause the middleware application 114 to generate an access request for a security artifact (e.g., a security artifact stored in a datastore associated with the middleware application 114), even if the end-user application 112 may not directly request the security artifact. In other instances, the end-user application 112 may directly request a security artifact.

In certain embodiments, the middleware application 114 provides a computing environment for the end-user application 112. For example, the middleware application 114 could be a platform as a service (PaaS) application and the end-user application 112 could be a software as a service (SaaS) application that runs on the platform to provide customer relationship management (CRM) functionality. In certain embodiments, the end-user application 112 runs on a cloud platform provided by the middleware application 114. An example of a middleware application that provides a cloud platform is Oracle Integration Cloud Service. The end-user application 112 could, alternatively, be an on-premises application executing locally on a machine at a user's location. The middleware application 114 can provide various services for the end-user application 112 including, for example, managing a database on behalf of a user.

Although shown as three layers, the software stack can include more or fewer layers. Thus, the software stack may include any number of layers that support the end-user application 112 directly or indirectly. For example, the software stack may include an OS 116 on which the middleware application 114 runs. Each layer of the software stack may have one or more datastores associated with it. For example, the end-user application 112 may be associated with a database 152, the middleware application 114 associated with a database 154, and the OS 116 associated with a file system 156. Datastores can be used for storing any type of data used by a layer. In certain embodiments, each of the datastores 152, 154, and 156 stores security artifacts for an associated layer. The security artifacts may be consumed by the associated layer or a different layer. For example, the database 154 may be configured as a default store for security artifacts used by the end-user application 112, but the owner/administrator of the end-user application may wish to use the database 152 to store the same security artifacts, either as a redundant form of storage or as a substitute for the database 154. Additionally, although datastores of one layer may in some instances be accessible to other layers, certain types of data may be access restricted. For example, certain security artifacts used by the OS 116 may be read-only for the end-user application 112. To prevent other layers from modifying these security artifacts, an appropriate access constraint may be defined in the security configuration of the OS 116 (e.g., a read-only constraint for the file system 156).

The security service system 120 may include a security controller 122 (e.g., a server running Oracle Platform Security Services) and security configurations 124. The security controller 122 can be implemented in hardware, software, or a combination thereof. The security controller 122 manages security artifacts by processing access requests received from the software application 110 to determine, for example, whether an access request should be granted and, if so, which datastore to use for servicing the access request. The security service system 120 can receive access requests from any layer in the software stack.

The security controller 122 may provide one or more security services for managing security artifacts. For example, credentials, keys, and policies can be managed through separate security services provided by the security controller 122. An instance of a security service can be defined for any layer in the software stack to manage the relevant security artifacts for that layer. Security service instances may be defined in security configurations. For example, a credential service could be defined in a security configuration for the end-user application 112 and a separate credential service defined in a security configuration for the middleware application 114.

The security configurations 124 may include security configurations for each of the layers in the software stack. A security configuration includes security settings, for example, access constraints for datastores, an order of access for datastores, and constraints for handling conflicts between datastores. In certain embodiments, the security settings for at least one of the layers is stored as a configuration file. For example, a security configuration for the middleware application 114 may be defined in a configuration file stored in a datastore accessible to the security service system 120. The security configurations 124 may also include a security configuration for a user interfacing layer (e.g., end-user application 112). The security configuration for the user interfacing layer may include security configurations for other layers, such as layers that support the user interfacing layer. An example security configuration is described later. In certain embodiments, a configuration file is formatted as an Extensible Markup Language (XML) or JavaScript Object Notation (JSON) file.

In certain embodiments, a custom security configuration may be defined for one or more users with respect to a user interfacing layer. In a multi-user or multi-tenanted environment, each instance of an end-user application can be considered to form an additional layer in the software stack. For example, a first user group 130 and a second user group 140 may correspond to different tenants, each tenant operating or administrating a separate instance of the end-user application 112. The end-user application 112 may be supplied with a default security configuration that includes one or more security settings that are user customizable. For example, the default security configuration may define an instance of a credential service that uses the database 154 for storing credentials. Instead of relying on the database 154, the user group 130 may wish to supply their own database 132. Similarly, the user group 140 may wish to outsource a database 142 from a third party. To accommodate these customizations, additional credential services may be defined for the user groups 130, 140 in their respective security configurations.

Not every security setting may be user customizable. For example, security services used by the OS 116 may be unavailable for user customization. In certain embodiments, the entity operating the security service system 120 is an administrator for a layer that supports the user interfacing layer. The operator of the security service system 120 may therefore determine which security settings are user customizable. In this way, users may be prevented from misconfiguring security settings that could adversely affect the operation of other layers that support the user interfacing layer.

Figure 2:
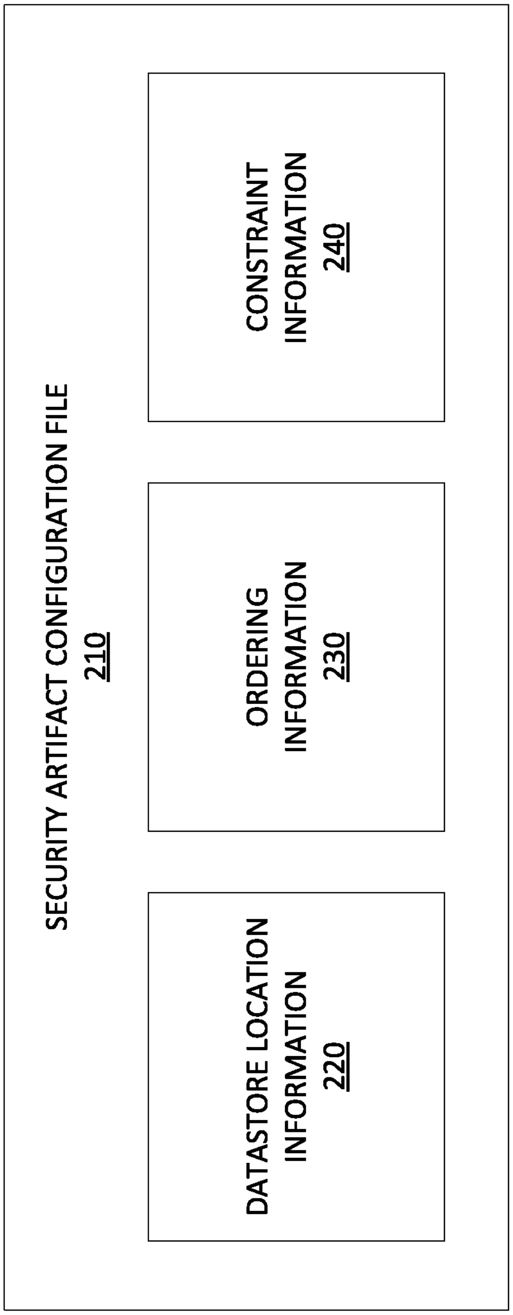
FIG. 2 depicts a security artifact configuration file according to certain embodiments.

FIG. 2 depicts a security artifact configuration file 210 according to certain embodiments. Security artifact configuration file 210 may define how to handle requests for security artifacts of a software application executing on a software stack (e.g., software application 110 in FIG. 1). For example, the security artifact configuration file 210 may include datastore location information 220. Datastore location information 220 may define one or more datastores for each layer. Each datastore may include one or more security artifacts.

A single layer may be associated with multiple datastores that store security artifacts. For example, a first set of one or more security artifacts may be stored in a file system and a second set of one or more security artifacts may be stored in a database. The file system and the database could store the same or different types of security artifacts. Additionally, a system managing security artifacts can provide a unified view of the datastores such that, from the end-user's perspective, there is only one logical datastore. For example, the security service system 120 could provide a composite credential store that encapsulates all the credential stores associated with the various layers. Similarly, the security service system 120 could provide a composite key store that encapsulates all the key stores associated with the various layers. Each composite datastore may appear to be a single datastore from the perspective of the end-user and/or the perspective of each layer (e.g., only the composite datastore and not the individual datastores that form the composite datastore may be visible to a layer). Because the composite datastore is made up of multiple datastores, individual datastores can be modified without having to bring the entire software application offline.

Security artifact configuration file 210 may further include ordering information 230. Ordering information 230 may define an order to access (1) artifacts associated with a layer relative to artifacts associated with another layer or (2) a datastore relative to another datastore associated with the same layer. The ordering information 230 can be applied when an access request is received for accessing a security artifact.

Security artifact configuration file 210 may further include constraint information 240. Constraint information 240 may define a constraint for a particular layer. Different constraints may be defined for different layers. Constraint information 240 may include access constraints that indicate a level of access for all the datastores associated with a layer or for an individual datastore associated with the layer. Examples of an access constraint include read-only, read-write, or cache-only.

Constraint information 240 may also include constraints that indicate actions to be performed for handling conflicts between datastores. For example, in certain embodiments, a base layer (e.g., OS 116) could be configured with a read-only constraint with respect to secrets (e.g., keys or credentials) such that all datastores that are associated with the base layer and store secrets are read-only. Then, additional constraints could be defined to implement the following example conflict rules:

- Any secret created while the software application is running follows a constraint that a secret is permitted to be created in a layer if and only if the secret doesn't already exist in any lower layer;
- A secret is permitted to be deleted from a layer if the secret exists in a datastore associated with that layer or in a datastore associated with a lower layer—provided that the layer/datastore from which the secret is to be deleted has not been marked read-only;
- A secret is permitted to be read from a layer if the secret exists in a datastore associated with that layer or in a datastore associated with a lower layer—provided that the layer from which the secret is to be read does not have additional policies to prevent access to the secret; and
- The software application is made unavailable if any of the layers is offline. Alternatively, in certain embodiments, the software application can run in a reduced functional state (e.g., cache-only or read-only) should one or more of the layers be offline. Additional constraints are possible. For example, in certain embodiments, upper layers may be allowed to overwrite credentials (but not other types of security artifacts) in datastores associated with lower layers.

The following is an example of a security configuration file according to certain embodiments.

```
    <?xml version="1.0" encoding="UTF-8" standalone="yes"?>
<Config>
  </propertySets>
    <propertySet name="props_db_one">
              <property name="datasource.jndi.name" value="jdbc/exampleDB"/>
              <property name="encryption.key.map" value="secretMap"/>
      </propertySet>
  </propertySets>
  <constraints>
    <constraint name="readonly">
      <actions>
```

-continued

```
                <actions>RO</action>
            </actions>
        <constraint>
    <constraints>
    <serviceProviders>
                    <serviceProvider type="KEY_STORE" name="keystore.provider"
class="oracle.security.jps.internal.keystore.KeyStoreProvider">
                    <description> PKI based Keystore Provider </description>
                    </serviceProvider>
                    <serviceProvider type="KEY_STORE" name="keystore.db.provider"
class="oracle.security.jps.internal.keystore.KeyStoreProvider">
                    <description> DB based Keystore Provider </description>
                    </serviceProvider>
                    <serviceProvider type="KEY_STORE" name="keystore.composite.provider"
class="oracle.security.jps.internal.keystore.composite.CompositeKeyStoreProvider">
                    <description> Composite Keystore Provider </description>
                    </serviceProvider>
                    <serviceProvider type="CREDENTIAL_STORE"
name="credstore.db.provider"
class="oracle.security.jps.internal.credstore.rdbms.DbmsCredentialStoreProvider">
                    <description> DB based Credential Provider </description>
                    </serviceProvider>
                    <serviceProvider type="CREDENTIAL_STORE" name="credstoressp"
class="oracle.security.jps.internal.credstore.ssp.SspCredentialStoreProvider">
                    <description> SecretStore based Credential Provider </description>
                    </serviceProvider>
                    <serviceProvider type="CREDENTIAL_STORE"
name="credstore.composite.provider"
class="oracle.security.jps.internal.credstore.composite.CompositeCredentialStoreProvider">
                    <description> Composite Credential Store Provider </description>
                    </serviceProvider>
    </serviceProviders>
    </serviceInstances>
                    <serviceInstance name="credstore" provider="credstoressp" location="./”>
                        <description> File Based Credential Store Service Instance </description>
                    </serviceInstance>
                    <serviceInstance name="keystore" provider="keystore.provider">
                        <description> Default JPS Keystore Service </description>
                        <property name=="keystore.file.path" value="./"/>
                    </serviceInstance>
                    <serviceInstance name="credstore.db" provider="credstore.db.provider">
                        <propertySetRef ref="props_db_one"/>
                    </serviceInstance>
                    <serviceInstance name="keystore.db" provider="keystore.provider">
                        <propertySetRef ref="props_db_one"/>
                    </serviceInstance>
                    <serviceInstance name="credstore.composite"
    provider="credstore.composite.provider" location=" ">
                        <serviceInstanceRef ref="credstore" constraintRef="readonly"
    order="1"/>
                        <serviceInstanceRef ref="credstore.db" order="2"/>
                    </serviceInstance>
                    <serviceInstance name="keystore.composite"
    provider="keystore.composite.provider" location=" ">
                        <serviceInstanceRef ref="keystore" constraintRef="readonly" order="1"/>
                        <serviceInstanceRef ref="keystore.db" order="2"/>
                    </serviceInstance>
    </serviceInstances>
    <Contexts default="default">
                    <Context name="default">
                        <serviceInstanceRef ref="credstore.composite"/>
                        <serviceInstanceRef ref="keystore.composite"/>
                    </Context>
</Config>
```

In the example security configuration file above, a read-only constraint has been defined along with various service instances including credential services ("credstore," "credstore.db," and "credstore.composite") and key store services ("keystore," "keystore.db," and "keystore.composite"). A read-only constraint, when applied to a layer or a datastore associated with the layer, makes the layer or datastore read-only. Other access constraints are also possible, e.g., a cache-only constraint would permit caching and returning of cached results even if the layer is not accessible (e.g., offline).

Each service is assigned a datastore, which could, for example, be a file system (denoted by "./") or a database. Other types of datastores can also be supported including, for example, Lightweight Directory Access Protocol (LDAP) based stores, custom key-value stores, or any type of datastore maintained in persistent storage or in-memory. The credstore.composite service includes credstore and credstore.db as sub-services, with the read-only constraint being applied to credstore and an order of access being specified for both credential sub-services (i.e., credstore has order=1 and credstore.db has order=2 so that credentials are read from credstore before credstore.db). Similarly, the keystore.composite service includes keystore and keystore.db as sub-services, with the read-only constraint and order=1 being applied to keystore.

Additionally, credstore.composite and keystore.composite are included in a default security context. Each layer may be configured with a corresponding security context that indicates what security settings apply to that layer, e.g., what policies to apply, what secrets to use, what certificates to trust, what audit policies are in effect, etc. Security contexts may be customizable, e.g., for a user interfacing layer.

Figure 3:
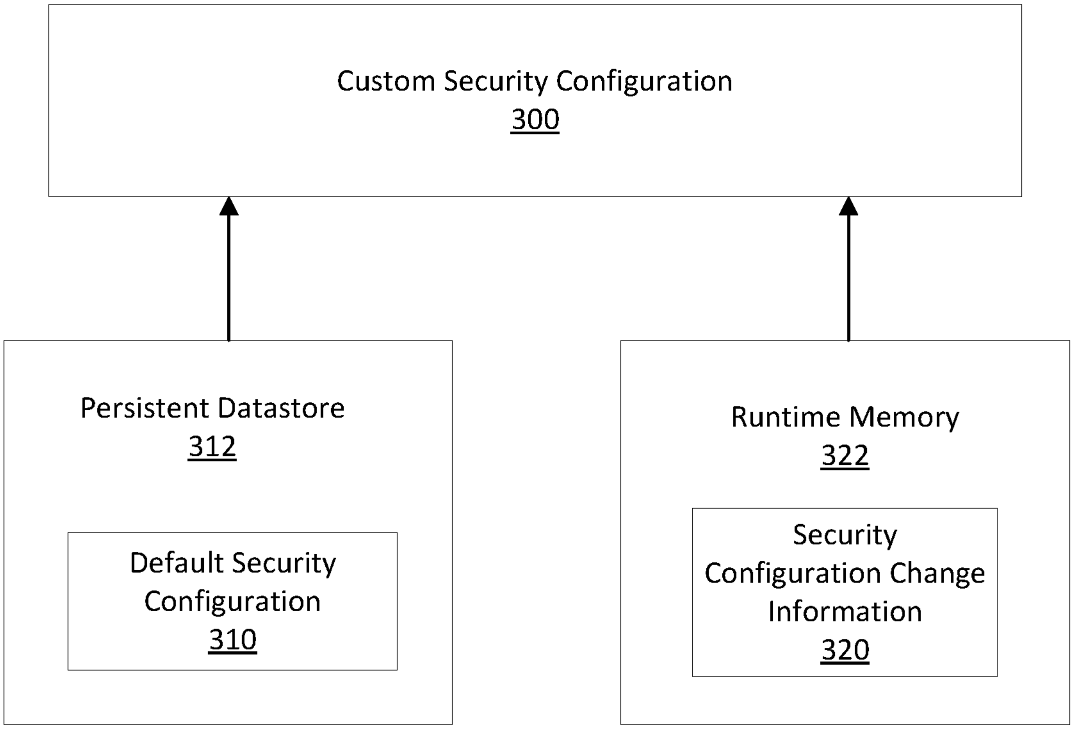
FIG. 3 depicts formation of a custom security configuration according to certain embodiments.

FIG. 3 is a simplified block diagram depicting formation of a custom security configuration 300. The custom security configuration 300 may be generated using a default security configuration 310 and security configuration change information 320. The security configuration 310 and security configuration change information 320 can be stored in separate memory or storage locations. For example, as shown in the figure, the default security configuration 310 could be stored in a persistent datastore 312 and the security configuration change information 320 could be stored in a runtime memory 322. The default security configuration 310 may define various security service instances within a default security context, as described in connection with the example security configuration file above. The security configuration change information 320 may include additional security settings or modifications to security settings of the default configuration. For example, the security configuration change information 320 could indicate additional security service instances or specify a different access constraint and/or order for a datastore referenced in the default security configuration 310.

The custom security configuration 300 may be generated at runtime of the software application by combining the default security configuration 310 with the security configuration change information 320. In certain embodiments, the security configuration change information 320 may be stored as in-memory "delta" information that does not include a complete security configuration, but instead includes only those changes being made relative to the default security configuration 310. At runtime, the security service system 120 may retrieve the default security configuration 310 and the security configuration change information 320 from their respective locations and combine them to form the custom security configuration 300. If the security configuration change information 320 is stored as delta information, combining is relatively straightforward as the security service system 120 can readily determine which security settings of the default security configuration 310 need to be changed. Storing the security configuration change information 320 as in-memory delta information avoids having to store the entire custom security configuration 300 in persistent storage, which may be advantageous if the security service system 120 is managing security artifacts on behalf of many users, each with their own custom security configurations. However, it is also possible to store the custom security configuration 300 in persistent storage, e.g., as a security configuration file in a database that stores the security configurations 124.

Example processes for defining and using security configurations for handling access requests will now be described in connection with FIGS. 4 to 7. The processing depicted in FIGS. 4 to 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIGS. 4 to 7 and described below are intended to be illustrative and non-limiting. Although FIGS. 4 to 7 depict various processing steps occurring in a particular sequence or order, this is not intended to be limiting. In certain alternative embodiments, the steps may be performed in some different order or some steps may also be performed in parallel. In certain embodiments, the processing depicted in FIGS. 4 to 7 may be performed, at least in part, by a security service system (e.g., security service system 120 in FIG. 1).

Figure 4:
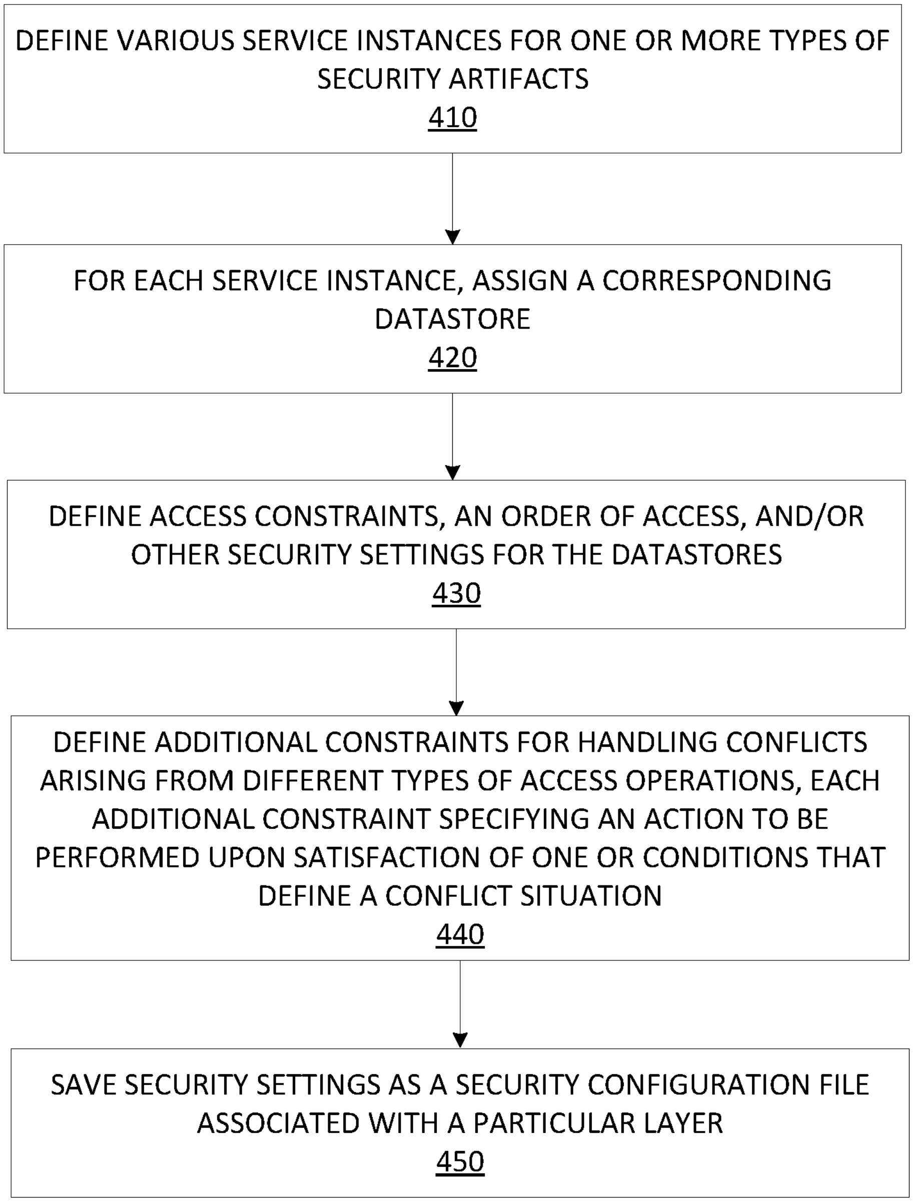
FIG. 4 is a simplified flowchart depicting a process for defining a security configuration according to certain embodiments.

FIG. 4 is a simplified flowchart depicting a process for defining a security configuration according to certain embodiments. At 410, various service instances are defined for one or more types of security artifacts. For example, a first service may be instantiated for credentials and a second service instantiated for keys. Further, as explained earlier in connection with the example security configuration file above, multiple services (e.g., credstore and credstore.db) can be defined for the same type of security artifact. For example, a composite service (e.g., credstore.composite) may be defined to include credential services of all the layers, thereby providing a composite credential store that encapsulates all of the credential stores.

At 420, a corresponding datastore is assigned to each service instance. For example, a first service instance may be assigned a file based store by including a reference to a file system identified by a file path. A second service instance may be assigned a database by including a reference to a location of the database (e.g., a name of a local database or a uniform resource locator (URL) of a remote database). In certain embodiments, service instances for different types of security artifacts may share the same datastore. For example, a credential service and a key service could store credentials and keys in a shared relational database.

At 430, security settings are defined for the datastores. These security settings may include access constraints (e.g., read-only, read-write, or cache-only), an order of access (e.g., order=1), and/or other security settings. In certain embodiments, security settings may be defined at the layer level, in which case the security settings may be inherited by any datastores with which the layer is associated.

At 440, additional constraints are defined for handling conflicts arising from different types of access operations (e.g., read, delete, or modify). Each additional constraint may specify an action to be performed upon satisfaction of one or more conditions that define a conflict situation. For example, a constraint may be defined for read operations on secrets, with a rule specifying that if a secret exists in a datastore associated with a layer requesting the read operation and in a datastore associated with a lower layer, then the secret should only be read from whichever datastore has been assigned a lower order number.

At 450, the security settings defined in steps 410 to 440 are saved as a security configuration file associated with a particular layer. The same security configuration file can be associated with multiple layers. For example, in certain embodiments, each layer may, absent any customization, be assigned a default security configuration that provides a unified view of the datastores in the various layers (e.g., based on one or more composite services, as described earlier). Alternatively, each layer may be associated with a different security configuration file (e.g., steps 410 to 450 could be repeated for each layer).

Figure 5:
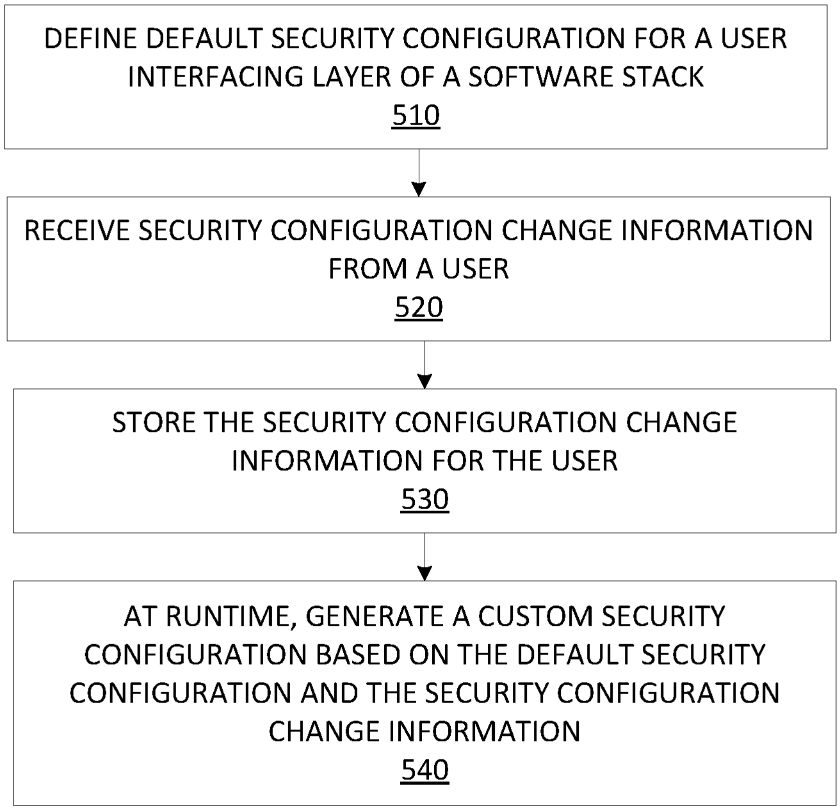
FIG. 5 is a simplified flowchart depicting a process for generating a custom security configuration, according to certain embodiments.

FIG. 5 is a simplified flowchart depicting a process for generating a custom security configuration, according to certain embodiments.

At 510, a default security configuration is defined for a user interfacing layer (e.g., the end-user application 112) of a software stack on which a software application is executed. The default security configuration may include one or more default services for one or more types of security artifacts. These default services may be services that were previously defined for other layers (e.g., the middleware application 114 and/or the OS 116). The default security configuration may also include one or more composite services (e.g., "keystore.composite" and "credstore.composite") that define a default security context for users.

At 520, security configuration change information is received from a user (e.g., an individual end-user or an entity representing a group of users). The security configuration change information may be generated, for example, using a software tool or user interface supplied by the operator of the security service system 120 to users upon purchasing the end-user application 112. A copy of the default security configuration may be supplied to the user along with indications of which security settings the user is permitted to customize. In certain embodiments, users may be provided with an option to directly upload custom security configurations or configuration changes, e.g., for storage as part of the security configurations 124.

The security configuration change information may indicate a user selected order of access for datastores associated with different layers. For example, the user may wish to prioritize a credential store associated with the user interfacing layer over a credential store associated with a lower layer. The security configuration change information may further include access constraints such as constraints that indicate a level of access for a particular datastore or for a set of datastores (e.g., for all datastores associated with the user interfacing layer).

In certain embodiments, a security artifact may be a certificate. Each layer of the software stack may have one or more certificates. However, the user may wish to control which certificates that the software application may use. Thus, the security configuration change information may indicate that one or more certificates associated with a first layer should be used instead of one or more certificates associated with a second layer.

In certain embodiments, a security artifact may be an authorization policy. Each layer of the software stack may have one or more authentication policies. However, the user may wish to control which authentication policies that the software application may use. Thus, the security configuration change information may indicate that one or more authentication policies associated with a first layer should be used instead of one or more authentication policies associated with a second layer.

In certain embodiments, one or more security artifacts for the software application may be encrypted. Techniques described herein allow for different encryption schemes to be used for different layers. For example, the security configuration change information could specify that a first type of encryption be used for encrypting security artifacts associated with a first layer (e.g., security artifacts in a particular datastore associated the first layer) and a second type of encryption for encrypting security artifacts associated with a second layer (e.g., security artifacts in a particular datastore associated with the second layer). Encryption schemes can also be customized by defining a list of users who are allowed to access an encryption key or specifying life cycles (e.g., an amount of time that an encryption key is valid).

At 530, the security configuration change information is stored for the user. As explained earlier, delta information that indicates changes relative to a default security configuration can be generated and stored in memory (e.g., a memory of a machine on which the end-user application 112 is running).

At 540, a custom security configuration is generated at runtime of the software application, based on the default security configuration and the security configuration change information. The custom security configuration can be generated, for example, according to the process depicted in FIG. 3. The custom security configuration can then be applied to access requests received from the software application.

Figure 6:
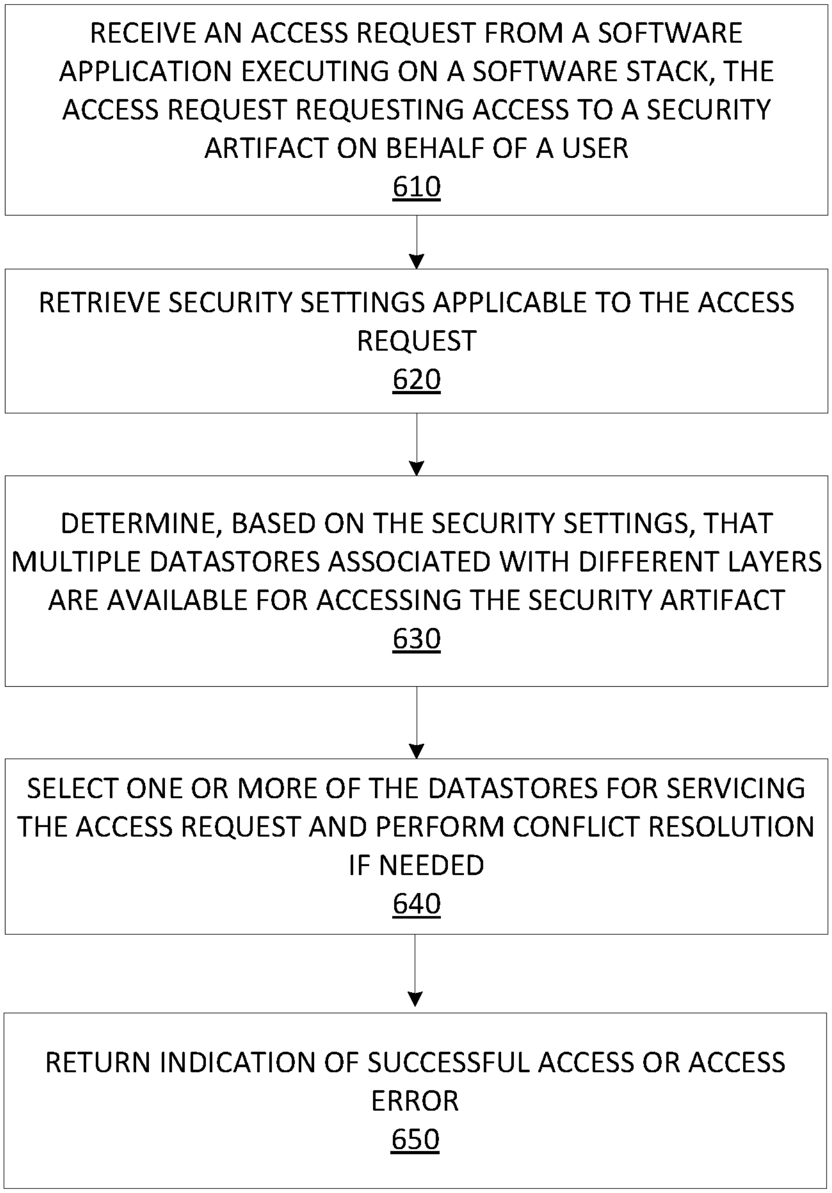
FIG. 6 is a simplified flowchart depicting processing performed for using a security configuration to handle access requests for security artifacts according to certain embodiments.

FIG. 6 is a simplified flowchart depicting processing performed for using a security configuration to handle access requests for security artifacts according to certain embodiments.

At 610, an access request is received (e.g., by security service system 120) from a software application executing on a software stack, the access request requesting access to a security artifact on behalf of a user. The access request could be a request to read or write a particular security artifact. The access request may be generated through a user interfacing layer. For example, the access request could be received directly from the user interfacing layer or generated by another layer in response to user input at the user interfacing layer. As mentioned earlier, the security service system may provide a unified view of the various datastores associated with the different layers (e.g., a composite datastore for one or more types of security artifacts). Thus, the existence of datastores associated with other layers may be hidden from the layer from which the access request is sent and/or the layer that caused the access request to be sent (e.g., the user interfacing layer), and the access request may be generated without knowledge of which datastore will be used for servicing the access request.

At 620, security settings that are applicable to the access request are retrieved. Retrieving security settings may include identifying a user for whom the access request was generated and retrieving a custom security configuration for the user. In certain embodiments, the security settings are retrieved using a "getContext(user)" operation that retrieves a default security context for the user. The default security context may include one or more services applicable to the access request. If a custom security configuration has been defined for the user, the getContext operation may be followed by a "getConfig(user)" operation that retrieves security configuration change information to generate the custom security configuration. The getContext and getConfig operations can be triggered through application program interface calls to the security service system. If no custom security configuration exists for the user, then the default security context may be applied. The retrieved security settings may include security settings for other layers besides the user interfacing layer. For example, as explained earlier, one or more services included in a default security context may be composite services that provide a composite datastore which encapsulates datastores associated with all of the layers. Thus, security settings for other layers may be retrieved along with security settings that are specific to the user interfacing layer.

At 630, a determination is made, based on the security settings retrieved in step 620, that multiple datastores associated with different layers are available for accessing the security artifact. The determination that multiple datastores are available can be based on the existence of security services that have been defined for different layers, each security service having been assigned a particular datastore. For example, if the access request is for a credential, the security service system may identify, via a "getCredential-Service" operation, a plurality of credential sub-services included in a composite credential service, each credential sub-service being associated with a particular layer.

At 640, one or more of the datastores are selected for servicing the access request. The selection can be based on applying the security settings retrieved in step 620. The retrieved security settings may include access constraints, order of access, constraints defined for handling conflict conditions, and/or other security settings that indicate which datastore(s) should be used for servicing the access request. For example, if the retrieved security settings indicate that an applicable security service has been assigned a first datastore with order=1, then the first datastore may be selected for servicing the access request. The requested security artifact is then accessed using the selected datastore(s), in accordance with an access operation indicated in the access request (e.g., read, modify, or delete). For example, if the requested security artifact is a credential, the credential may be accessed using a "getCred(Cx)" operation, where Cx indicates the particular credential to be accessed. At runtime, the security service system may determine which datastore(s) the credential resides in, how to access the credential, and whether the request is allowed to proceed, based on the access constraints and policies that have been specified in the security settings that were retrieved in step 620. Alternatively, the credential may be accessed using a "getCred(Dx)" operation, where Dx indicates the particular datastore being accessed. Conflict resolution may also be performed if needed. For example, if multiple getCred operations are performed (e.g., to read from multiple datastores), a conflict resolution procedure may be used to select from among the results of the getCred operations. Thus, conflict resolution may be performed to select a particular datastore for servicing the access request.

At 650, an indication of successful access or access error is returned to the software application. If the access request is for reading a security artifact, the security artifact may be returned to the layer from which the access request was received in step 610. If the access request is for writing a security artifact, a confirmation that the security artifact has been written successfully can be returned. An indication of access error may be returned if the access request was denied for any reason (e.g., no datastore is available for servicing the access request, the user does not have sufficient access privileges, or a conflict could not be resolved).

FIG. 7 is a simplified flowchart depicting processing performed for modifying or replacing a datastore during runtime of a software application according to certain embodiments.

At 710, a security configuration is identified for a user of the software application. The security configuration can be identified, for example, during startup of the end-user application 112 or in connection with an access request generated on behalf of the user. The security configuration includes a first association indicating that one or more security artifacts associated with a first layer are stored in a first datastore. The security configuration may further include additional associations, e.g., a second association indicating that one or more security artifacts associated with a second layer are stored in a second datastore.

At 720, a request to modify or replace the first datastore is received during execution of the software application. For example, the request may be for replacing the first datastore with a third datastore or for updating to a new version of the first datastore.

At 730, the first datastore is modified or replaced based on the request received in step 720. For example, if the request is for replacing the first datastore, the first association can be changed to indicate that the one or more security artifacts associated with the first layer are now stored in the third datastore (e.g., by updating the security configuration to switch the datastore assigned to a security service from the first datastore to the third datastore). Alternatively, if the request is to modify the first datastore, the first datastore may be modified, e.g., by replacing content of the first datastore. In certain embodiments, the first datastore is modified or replaced by a user.

At 740, an access request for a security artifact is received while the first datastore is being modified or replaced. The access request may be received, for example, while the first datastore is taken offline to perform an update on the first datastore or while the security configuration is being updated to change the first association. The security artifact is accessible with respect to the first datastore (e.g., can be read from or written to the first datastore) when the first datastore is available. However, because the first datastore is being modified or replaced, the first datastore is currently unavailable.

At 750, an alternative datastore is identified for accessing the security artifact. For example, if the access request is for reading the security artifact, the security service system may determine, based on the security configuration, that there is an applicable security service associated with the second layer and that a datastore associated with the second layer (e.g., the second datastore) remains available for servicing the request.

At 760, a conflict resolution procedure is performed to determine whether the access request can be serviced using the alternative datastore. For example, if the access request is for reading a security artifact, the security service system may determine that a conflict resolution rule (e.g., a rule defined in the security configuration identified in step 710) permits reading from the alternative datastore or reading from a cached version of the first datastore.

Figure 8:
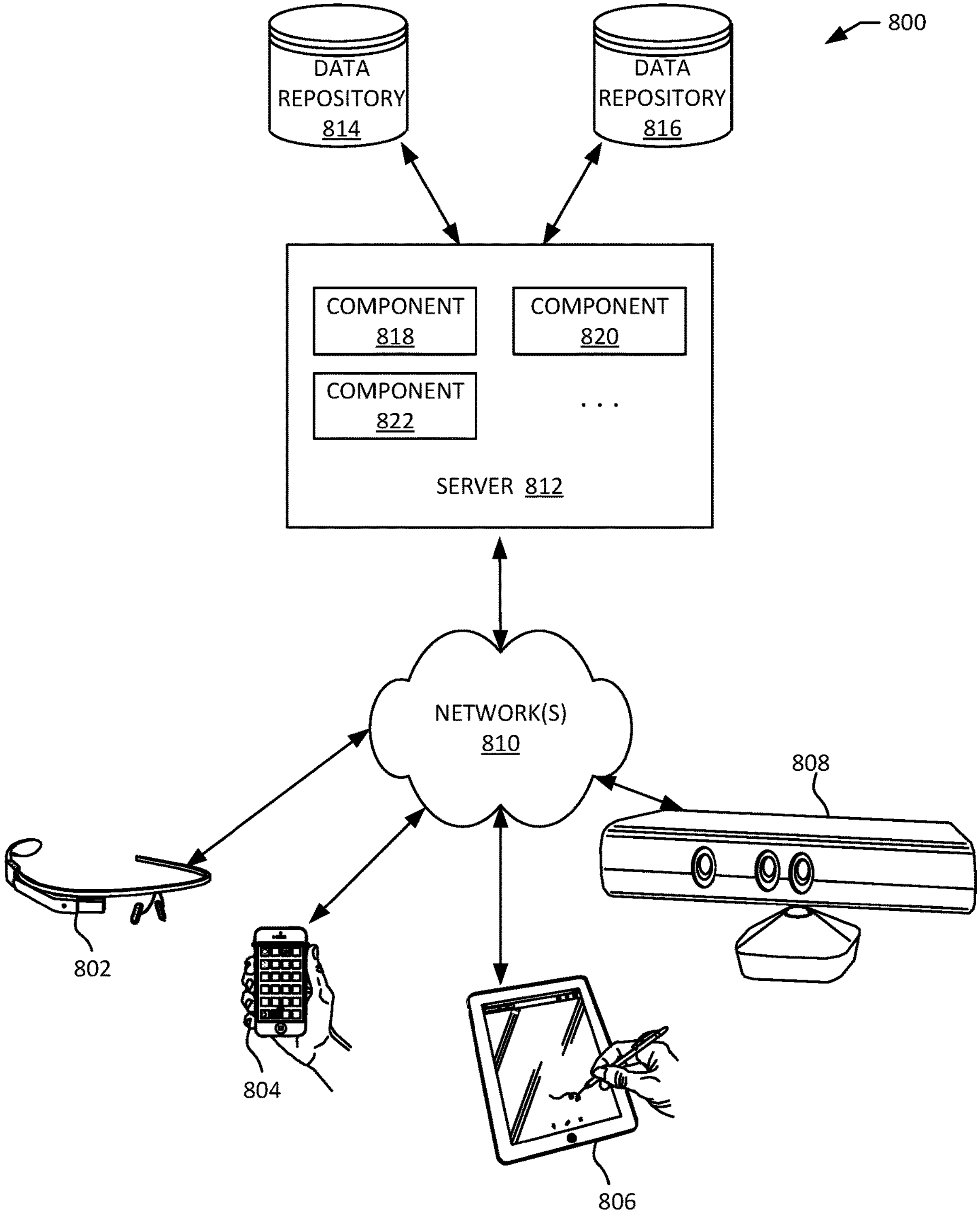
FIG. 8 depicts a distributed system for implementing one or more embodiments.

FIG. 8 depicts a simplified diagram of a distributed system 800 for implementing an embodiment. In the illustrated embodiment, distributed system 800 includes one or more client computing devices 802, 804, 806, and 808, coupled to a server 812 via one or more communication networks 810. Client computing devices 802, 804, 806, and 808 may be configured to execute one or more applications.

In various embodiments, server 812 may be adapted to run one or more services or software applications that enable access to security artifacts during execution of a software application on a software stack, as described in this disclosure.

In certain embodiments, server 812 may also provide other services or software applications that may include non-virtual and virtual environments. In some embodiments, these services may be offered as web-based or cloud services, such as under a SaaS model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 to execute one or more applications, which may generate one or more access requests for security artifacts in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 may include one or more virtual machines running virtual operating systems, or other computing architectures involving virtualization such as one or more flexible pools of logical storage devices that may be virtualized to maintain virtual storage devices for the server. In various embodiments, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, Java® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain embodiments. For example, one or more of the data repositories 814, 816 may be used to store information such as security configurations and/or security artifacts. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain embodiments, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 814, 816 may also be used by applications to store application data (e.g., security artifacts). The data repositories used by applications may be of different types such as, for example, a key-value store repository, an object store repository, or a general storage repository supported by a file system.

Figure 9:
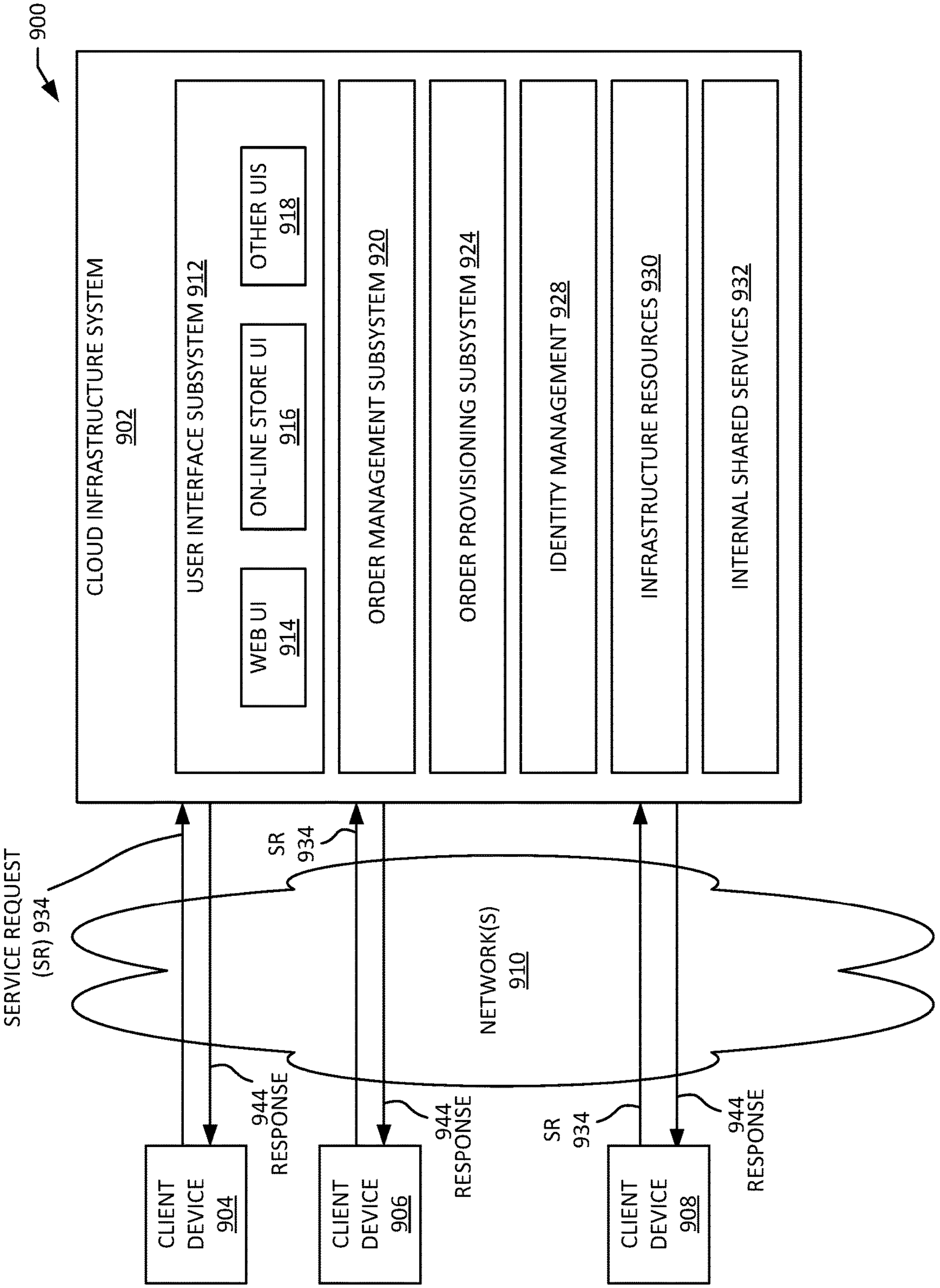
FIG. 9 is a simplified block diagram of a cloud-based system environment in which various security artifact-related services may be offered as cloud services.

In certain embodiments, security artifact-related functionalities described in this disclosure may be offered as services via a cloud environment. FIG. 9 is a simplified block diagram of a cloud-based system environment 900 in which various security artifact-related services may be offered as cloud services, in accordance with certain embodiments. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 902 may provide one or more cloud services using different models such as under a SaaS model, a PaaS model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a user may request the cloud infrastructure system to register an application and to define one or more security configurations for the application. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer may be an individual or an enterprise. In certain other embodiments, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request a security artifact-related service described in this disclosure.

In some embodiments, the processing performed by cloud infrastructure system 902 for providing security artifact-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for determining which datastore to use for accessing a security artifact (e.g., based data indicating an availability and/or frequency of access for the various datastores). The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like. In certain embodiments, the storage virtual machines that are available for servicing storage requested from applications may be part of cloud infrastructure system 902. In other embodiments, the storage virtual machines may be part of different systems.

In certain embodiments, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a security artifact-related service offered by cloud infrastructure system 902. As part of the order, the customer may provide information identifying an application for which the service is to be provided (e.g., end-user application 112 in FIG. 1) and customization information (e.g., security configuration change information 320 in FIG. 3).

In certain embodiments, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services. In certain embodiments, for a customer requesting a security artifact-related service, the response may include an acknowledgement that the requested security artifact-related service has been successfully configured (e.g., a confirmation that a security configuration or security configuration change information has been stored for a user).

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customer information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
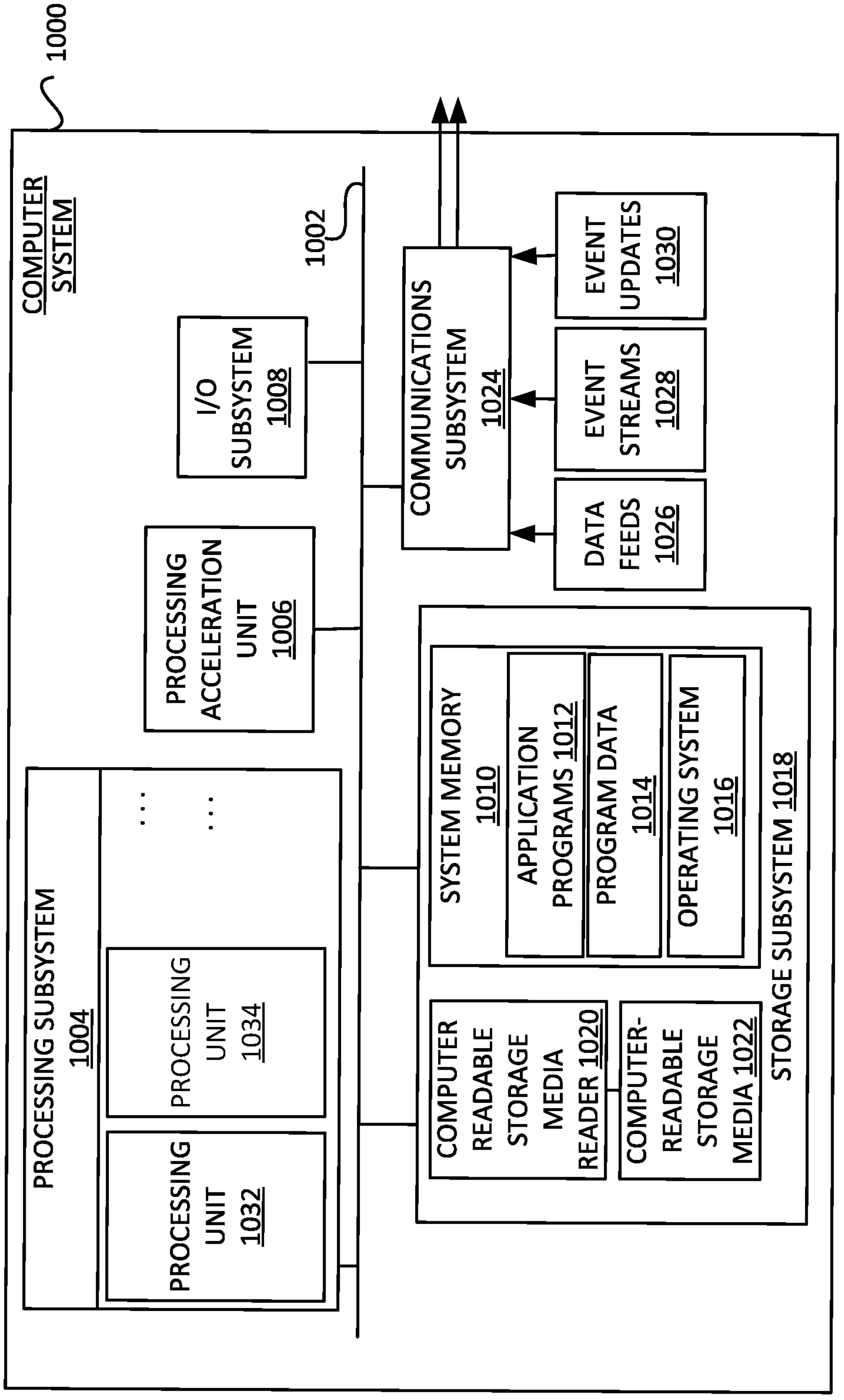
FIG. 10 illustrates an example of a computer system for implementing one or more embodiments.

FIG. 10 illustrates an exemplary computer system 1000 that may be used to implement certain embodiments. For example, in some embodiments, computer system 1000 may be used to implement any of the various servers and computer systems described above (e.g., security service system 120). As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some embodiments, processing subsystem 1004 may include one or more special purpose co-processors such as graphics processors, digital signal processors (DSPs), or the like. In some embodiments, some or all of the processing units of processing subsystem 1004 may be implemented using customized circuits, such as application specific integrated circuits (ASICs), or field programmable gate arrays (FPGAs).

In some embodiments, the processing units in processing subsystem 1004 may execute instructions stored in system memory 1010 or on computer readable storage media 1022. In various embodiments, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or datastore for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide services in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that may further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement security service system 120 depicted in FIG. 1, the communication subsystem may be used to communicate with a computer system on which the software application 110 is running.

Communication subsystem 1024 may support both wired and/or wireless communication protocols. In certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1024 may provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method for managing access to security artifacts, the method comprising:

receiving, by one or more processors of a computer system, an access request from a software application executing on a software stack, the software stack including a user interfacing layer through which the access request is generated for a first user, wherein the access request identifies a security artifact to be accessed, wherein the software stack comprises a plurality of different layers and each of the plurality of different layers is respectively associated with one or more datastores, and wherein the one or more datastores associated with each respective layer stores one or more security artifacts for the respective layer;

retrieving, by the one or more processors, security settings that are applicable to the access request, wherein the security settings include settings configured for the user interfacing layer;

determining, based on the security settings, that multiple datastores are available for accessing the security artifact, wherein the multiple datastores are associated with different layers of the software stack; and selecting, by the one or more processors, at least one of the datastores of the multiple datastores that are available for accessing the security artifact.

2. The method of claim 1, further comprising:

generating, by the one or more processors, a unified view of the multiple datastores such that an existence of one or more of the datastores is hidden from the user interfacing layer.

3. The method of claim 1, wherein the security settings include settings configured for a second layer of the software stack.

4. The method of claim 3, further comprising:

applying, by the one or more processors, the settings configured for the second layer to read the security artifact from, or write the security artifact to, a datastore associated with the second layer in connection with servicing the access request.

5. The method of claim 1, wherein the settings configured for the user interfacing layer include custom settings for the first user.

6. The method of claim 5, wherein retrieving the security settings comprises performing the following during execution of the software application:

retrieving default security settings configured for the user interfacing layer from a first memory or storage location;

retrieving security configuration change information indicative of the custom settings from a second memory or storage location; and combining the default security settings with security configuration change information to generate a custom security configuration for the first user.

7. The method of claim 1, further comprising:

determining, based on the security settings, an order in which the security artifact is written to or read from the at least one of the datastores.

8. The method of claim 1, wherein the security settings indicate access constraints for the datastores, the access constraints including one or more of read-only, write-only, or cache-only.

9. The method of claim 1, wherein the security settings indicate a first encryption scheme for the user interfacing layer and a second encryption scheme for a second layer of the software stack, the first encryption scheme being different from the second encryption scheme, the method further comprising:

applying the first encryption scheme to security artifacts in a datastore associated with the user interfacing layer; and applying the second encryption scheme to security artifacts in a datastore associated with the second layer.

10. The method of claim 1, wherein the datastores include at least one file system and at least one database.

11. The method of claim 1, wherein the security artifact is a key, a certificate, a credential, a token, an authorization policy, or an audit policy.

12. The method of claim 1, further comprising:

during execution of the software application, receiving a second access request while a first datastore is being modified or replaced, the second access request being for a second security artifact that is accessible with respect to the first datastore when the first datastore is available; and identifying an alternative datastore for accessing the second security artifact, wherein the alternative datastore is associated with a different layer than the first datastore.

13. The method of claim 1, further comprising:

receiving, by the one or more processors, a second access request generated through a second user interfacing layer, the second access request being for a second user, wherein the second access request identifies a second security artifact to be accessed;

retrieving, by the one or more processors, additional security settings that are applicable to the second access request, wherein the additional security settings include settings configured for the second user interfacing layer; and applying the additional security settings to the second access request.

14. A computer system for managing access to security artifacts, the computer system comprising:

one or more processors; and a memory coupled to the one or more processors, the memory storing a plurality of instructions that when executed by the one or more processors cause the one or more processors to:

receive an access request from a software application executing on a software stack, the software stack including a user interfacing layer through which the access request is generated for a first user, wherein the access request identifies a security artifact to be accessed, wherein the software stack comprises a plurality of different layers and each of the plurality of different layers is respectively associated with one or more datastores, and wherein the one or more datastores associated with each respective layer stores one or more security artifacts for the respective layer;

retrieve security settings that are applicable to the access request, wherein the security settings include settings configured for the user interfacing layer;

determine, based on the security settings, that multiple datastores are available for accessing the security artifact, wherein the multiple datastores are associated with different layers of the software stack; and select at least one of the datastores of the multiple datastores that are available for accessing the security artifact.

15. The computer system of claim 14, wherein the plurality of instructions further cause the one or more processors to generate a unified view of the multiple datastores such that an existence of one or more of the datastores is hidden from the user interfacing layer.

16. The computer system of claim 14, wherein the security settings include settings configured for a second layer of the software stack.

17. The computer system of claim 16, wherein the plurality of instructions further cause the one or more processors to apply the settings configured for the second layer to read the security artifact from, or write the security artifact to, a datastore associated with the second layer in connection with servicing the access request.

18. The computer system of claim 14, wherein the settings configured for the user interfacing layer including custom settings for the first user, and wherein the plurality of instructions further cause the one or more processors to, during execution of the software application:

retrieve default security settings configured for the user interfacing layer from a first memory or storage location;

retrieve security configuration change information indicative of the custom settings from a second memory or storage location; and combine the default security settings with the security configuration change information to generate a custom security configuration for the first user.

19. The computer system of claim 14, wherein the plurality of instructions further cause the one or more processors to:

during execution of the software application, receive a second access request while a first datastore is being modified or replaced, the second access request being for a second security artifact that is accessible with respect to the first datastore when the first datastore is available; and identify an alternative datastore for accessing the second security artifact, wherein the alternative datastore is associated with a different layer than the first datastore.

20. A non-transitory computer-readable medium storing a plurality of instructions that, upon execution by one or more processors, cause the one or more processors to:

receive an access request from a software application executing on a software stack, the software stack including a user interfacing layer through which the access request is generated for a first user, wherein the access request identifies a security artifact to be accessed, wherein the software stack comprises a plurality of different layers and each of the plurality of different layers is respectively associated with one or more datastores, and wherein the one or more datastores associated with each respective layer stores one or more security artifacts for the respective layer;

retrieve security settings that are applicable to the access request, wherein the security settings include settings configured for the user interfacing layer;

determine, based on the security settings, that multiple datastores are available for accessing the security artifact, wherein the multiple datastores are associated with different layers of the software stack; and select at least one of the datastores of the multiple datastores that are available for accessing the security artifact.

* * * * *